United States Patent [19]

Kim

[11] Patent Number: 5,526,130
[45] Date of Patent: Jun. 11, 1996

[54] RESERVED VIDEO RECORDING METHOD AND APPARATUS THEREFOR BASED ON TITLE CHARACTER INPUT

[75] Inventor: Hak-Sung Kim, Seoul, Rep. of Korea

[73] Assignee: Samsung Electronics Co., Ltd., Kyungki-Do, Rep. of Korea

[21] Appl. No.: 116,532

[22] Filed: Sep. 7, 1993

[30] Foreign Application Priority Data

Sep. 4, 1992 [KR] Rep. of Korea ............... 92-16150

[51] Int. Cl.$^6$ .................. H04N 5/76; H04N 5/50
[52] U.S. Cl. ............... 358/335; 348/731; 348/468; 360/33.1; 360/69; 455/186.1
[58] Field of Search ............. 358/335; 360/33.1, 360/35.1, 69; 348/731, 732, 733461, 468; 455/181.1, 185.1, 186.1, 186.2; H04N 5/76, 9/79, 9/52, 5/50

[56] References Cited

U.S. PATENT DOCUMENTS

| | | | |
|---|---|---|---|
| 4,706,121 | 11/1987 | Young | 358/335 |
| 4,879,611 | 11/1989 | Fukui et al. | 360/33.1 |
| 4,977,455 | 12/1990 | Young | 358/335 |
| 4,991,025 | 2/1991 | Eigeldinger | 358/335 |
| 5,293,357 | 3/1994 | Hallenbeck | 358/335 |
| 5,296,931 | 3/1994 | Na | 348/731 |

FOREIGN PATENT DOCUMENTS

| | | | |
|---|---|---|---|
| 1168173 | 7/1989 | Japan | H04N 5/44 |
| 388159 | 4/1991 | Japan | G11B 15/02 |

*Primary Examiner*—Thai Q. Tran
*Attorney, Agent, or Firm*—Sughrue, Mion, Zinn, Macpeak & Seas

[57] ABSTRACT

A video cassette recorder and the like for performing a reserved video recording of a broadcast program includes a data input device for providing a program title during a reserved video recording establishment period, a schedule data processor for separating broadcast program schedule data from a broadcast signal received through a tuner and for storing the schedule data temporarily, a controller for encoding the program title to produce encoded data, for comparing the encoded data with the schedule data and for storing the schedule data as stored data when a match occurs and video recording controller for comparing the broadcast program schedule data with the stored data for producing a video recording control signal when the broadcast program corresponding to the stored data has been received. A method for performing character input reserved video recording is also described.

23 Claims, 8 Drawing Sheets

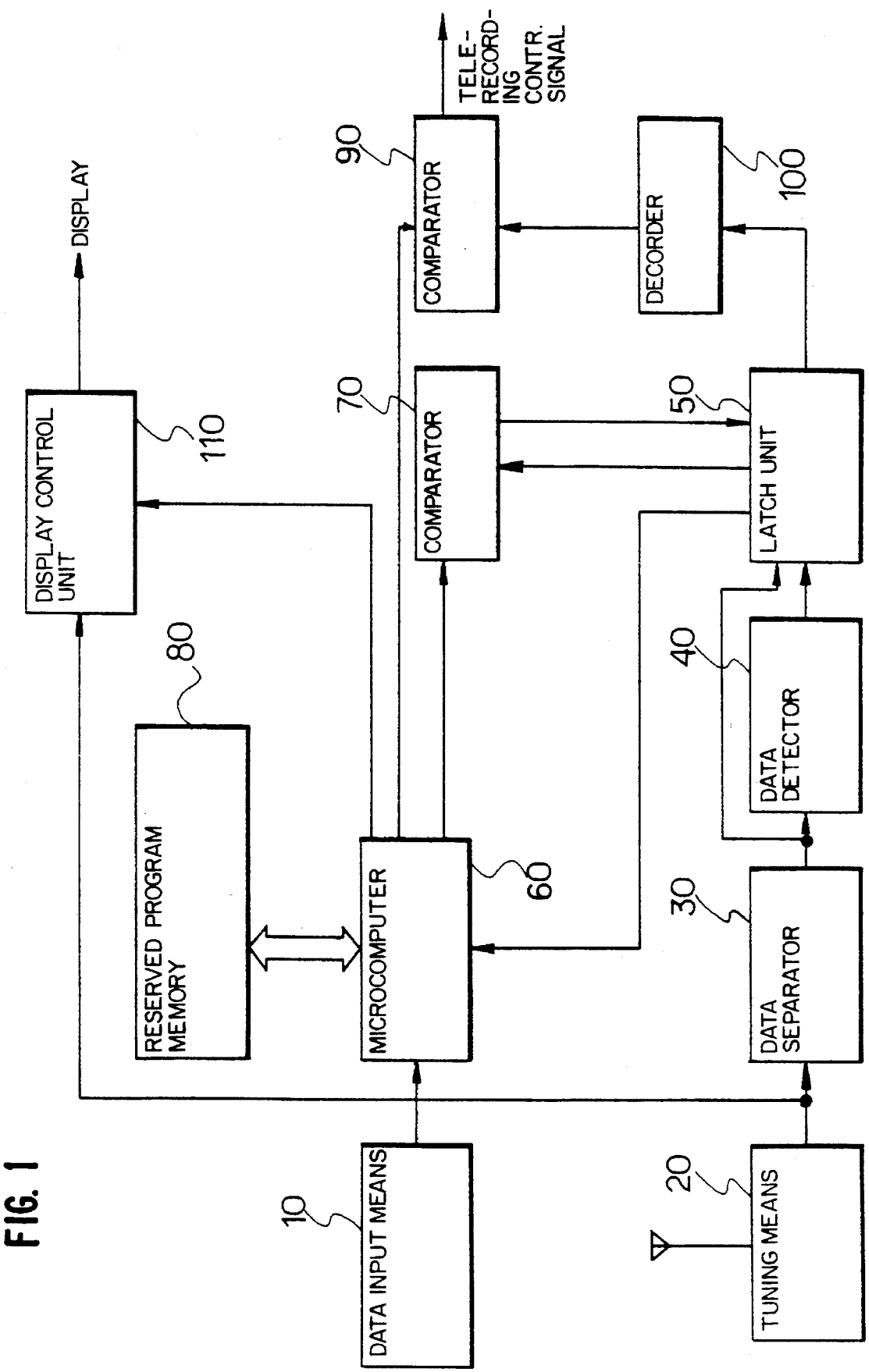

FIG. 2A

| character | ㄱ | ㄴ | ㄷ | ㄹ | ㅁ | ㅂ | ㅅ | ㅇ | ㅈ | ㅊ | ㅋ | ㅌ | ㅍ | ㅎ |
|---|---|---|---|---|---|---|---|---|---|---|---|---|---|---|
| code | 00 | 01 | 02 | 03 | 04 | 05 | 06 | 07 | 08 | 09 | 0A | 0B | 0C | 0D |
| character | ㅏ | ㅑ | ㅓ | ㅕ | ㅗ | ㅛ | ㅜ | ㅠ | ㅡ | ㅣ | ㅐ | ㅒ | ㅔ | ㅖ |
| code | 10 | 11 | 12 | 13 | 14 | 15 | 16 | 17 | 18 | 19 | 1A | 1B | 1C | 1D |

| DATA PACKET RECOGNITION DATA | WHOLE TITLE OF BROADCASTING PROGRAM | RESERVED PROGRAM RECOGNITION | STARTING TIME DATA | FINISH TIME DATA | CHANNEL DATA | BROAD-CASTING DATE DATA |
|---|---|---|---|---|---|---|

FIG. 5B

| SUB-DATA PACKET RECOGNITION DATA | STARTING TIME DATA | FINISH TIME DATA | BROAD-CASTING DATE DATA |
|---|---|---|---|

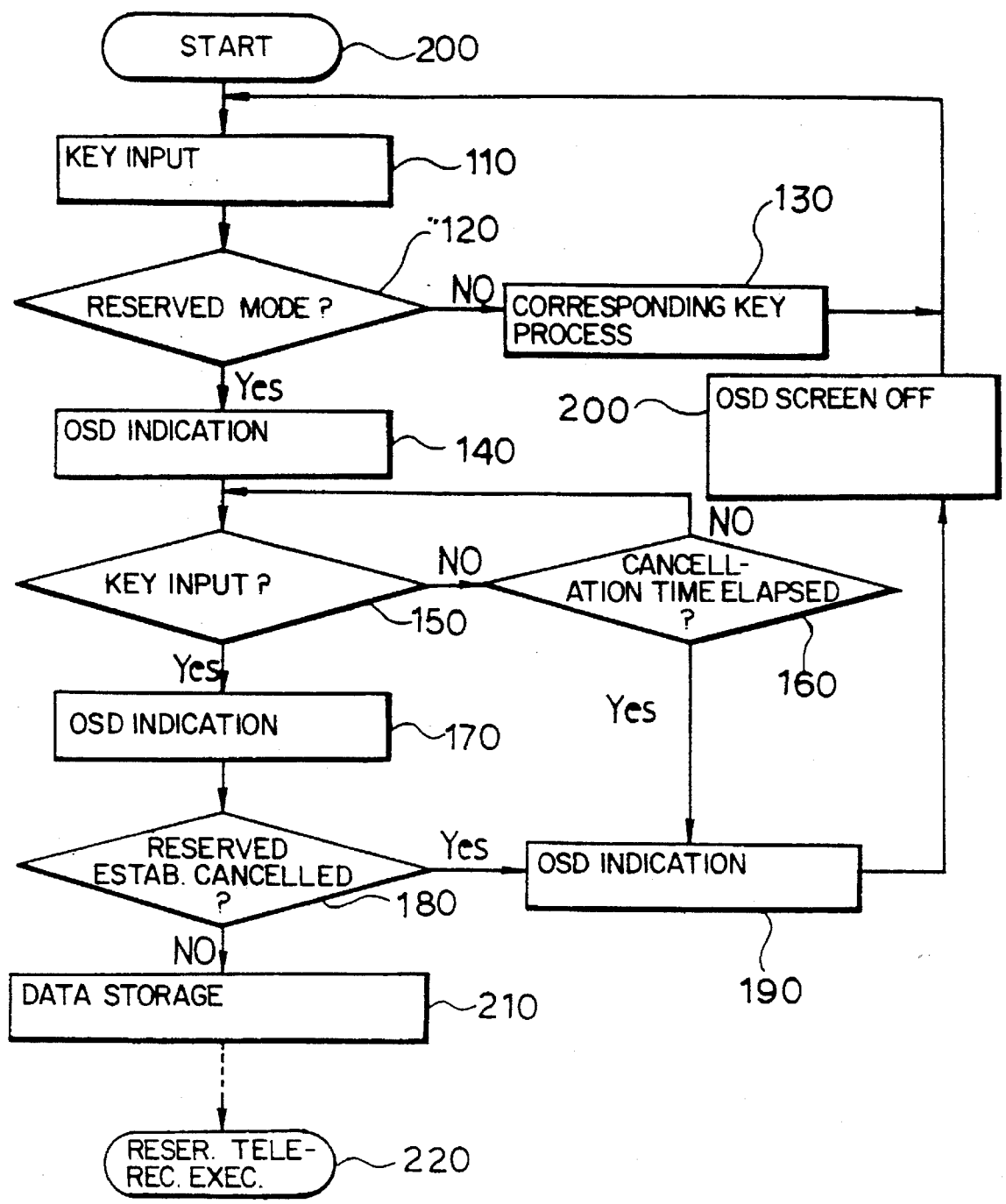

RESERVED VIDEO RECORDING METHOD AND APPARATUS THEREFOR BASED ON TITLE CHARACTER INPUT

BACKGROUND OF THE INVENTION

1. Field of the Invention

The present invention relates to instruments such as video cassette recorders (VCRs) and the like for performing a reserved video recording of a broadcast program. More specifically, the present invention relates to a character input reserved video recording method wherein a program corresponding to a direct input of a title for that program can be video recorded. In short, entry of the program title allows reserved video recording of the corresponding program. An apparatus suitable for implementing the inventive method is also disclosed.

Korean Patent Application No. 92-16150 is incorporated herein by reference for all purposes.

2. Description of the Prior Art

Generally, apparatuses, e.g., VCRs and the like, for reserved video recording of a broadcast program are known. In the known apparatus, a user inputs information about a broadcast program desired to be video recorded. Then, the programmed starting time of the reserved video recording is compared current time, e.g., a clock, in the VCR. As a result of the comparison, if the starting time corresponds with the current time, the VCR is activated to record the reserved video program.

It will be noted that the apparatus also determines whether a finishing time of the reserved video recording has arrived during the video recording of the reserved program. If the finishing time has arrived, the apparatus finishes the video recording to thereafter turns off the power or puts the apparatus into a standby operating mode. If a separate tuner is included in the VCR, the video recording can be made of the desired program when the corresponding starting time arrives irrespective of the operating condition of other video equipment, e.g., a television.

However, in order to perform a typical reserved video recording, a great deal of information has to be input with respect to the program. Thus, with the assistance of data sources, e.g., newspapers or television information magazines, listing information on broadcast programs, the station channel, starting time of the program (year, month, date, time, minute), finishing time, repeat mode (NORMAL, DAILY, WEEKLY), speed mode (SP, LP, SLP) of the VCR and the like can be preset. It will be appreciated that the information input process about the program can be so complicated that the user experiences a great deal of inconvenience because the channel, date, starting time, finishing time and the like have to be input as numbers.

In order to remove these inconveniences, e.g., as a way to simplify the reserved video recording, a method for programming has been developed utilizing a code. More specifically, in Japanese Laid-Open Patent Application No. Hei 1-168173 (1989), entitled, "Reservation Video Recording Method" a method has been described for reserved video recording of a program by entering a code, comparing the code to a code broadcast at the start of the program and confirming coincidence between the entered code and the broadcast code. However, because the thus-mentioned method calls for coding of various programs of each broadcast station, there arises a problem in that numbers the user has to input gets increased and the reserved video recording gets impossible when the data carrying the broadcast programs is fouled up.

Furthermore, in the thus-described method, there is no counter-measure for coping with the situation where the broadcast plan is suddenly changed, making the sequential video recording of such serial programs as the soap operas, mini-series, etc., can not be performed using a DAILY or WEEKLY video recording mode.

Likewise, the title of the video program can not be confirmed during confirmation of the reserved program. Thus, there arises another problem in that the user can not definitely know whether the entered data corresponds to the program that the user intends to record.

By way of example, in Japanese Laid-Open Patent Application No. Hei 3-88159 (1991), entitled "Program Reserving System" a technique has been proposed where, when a title of a sought-after program is located in a reservation mode by way of a database search, a reservation set-up data including the reservation mode of the corresponding program, channel, starting time, finishing time and recording start date is generated and the generated data is transmitted to a recording means to thereby perform a reserved establishment of the program. In accordance with Japanese Laid-Open Patent Application No. Hei 3-88159, the recorded program information is provided on a recording medium such as a as a CD-ROM and the like. However, in the method thus described, a separate apparatus for searching the CD-ROM is needed, thus making the method both expensive and inconvenient as well.

The present invention was motivated bey a desire to overcome the above-mentioned problems.

SUMMARY OF THE INVENTION

Accordingly, it is an object of the present invention to provide a character input reserved video recording for performing a reserved video recording in response to direct input of a program title.

Another object of the present invention to provide a character input reserved video recording apparatus for performing video recording in response to direct input of a program title wherein the programming is simplified. According to one aspect of the invention, the program can be reservedly video recorded regardless of program changes as well.

These and other objects, features and advantages in accordance with the present invention are provided by a character input reserved video recording method, including steps for:

providing a title of a program during a reserved video recording;

encoding the program title input at the providing step to thereby permit detection of data corresponding to the program title out of received broadcast program schedule data and comparing the encoded data with the program schedule data;

when both data are identical, detecting and storing the broadcast program schedule data to thereby store the same; and recording the corresponding broadcast program in accordance with the broadcast program schedule data detected and stored during the previous step.

These and other objects, features and advantages in accordance with the present invention are provided by a character input reserved video recording apparatus, including:

a data input device for providing a title of a program during a reserved video recording establishment;

a schedule data processor for separating a broadcast program schedule data from a broadcast signal received through a tuner to thereby store the same temporarily per data;

a controller for encoding the title input through the data input device to thereby compare the same with a code of the title stored in the schedule data processor and to store the corresponding broadcast program schedule data if they are identical; and a video recording controller for comparing the broadcast program schedule data stored in the controller with the broadcast program schedule data processed at the schedule data processor to thereby output a video recording control signal if it is determined that the corresponding broadcast program has been received.

These and other objects, features and advantages of the invention are disclosed in or apparent from the following description of preferred embodiments.

BRIEF DESCRIPTION OF THE DRAWINGS

A fuller understanding of the nature and objects of the invention can be had by reference to the following detailed description taken in conjunction with the accompanying drawings, in which:

FIG. 1 is a high level block diagram of a character input reserved video recording apparatus in accordance with a preferred embodiment of the present invention;

FIG. 2A through 2C collectively illustrate a general method for entering character data in the circuitry illustrated in FIG. 1;

FIG. 5A is an illustration of a data packet as shown in FIG. 4;

FIG. 5B depicts the format of a sub-data packet illustrated in FIG. 4;

FIGS. 6 and 7 are flow charts of a character input reserved video recording method in accordance with the present invention;

DETAILED DESCRIPTION OF THE INVENTION

Figure 3:
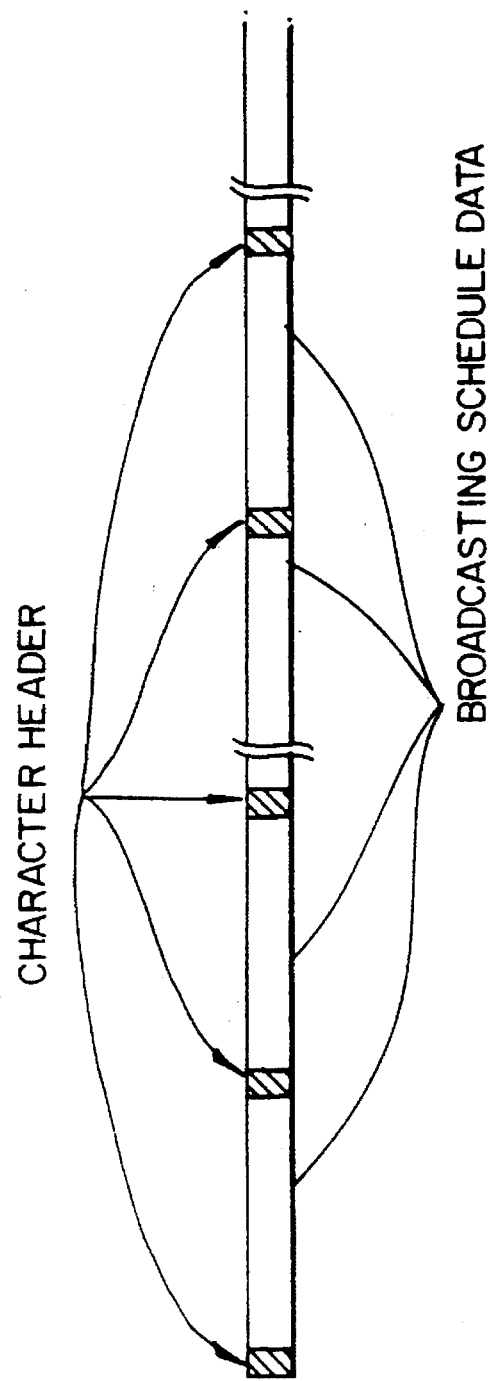
FIG. 3 is an illustration useful in describing the format of a broadcast program schedule data in accordance with the present invention.

FIG. 1 is a block diagram of a character input reserved video recording apparatus in accordance with a preferred embodiment of the present invention, where the character input reserved video recording apparatus includes a data input device 10 for entering the title of a selected program during reserved video recording designation, a schedule data processor for separating a broadcast program schedule data from a broadcast signal received through a tuner 20 and for temporarily storing the program schedule data, a controller for encoding the title input through the data input device 10, for comparing the title with a code of the title stored in the schedule data processor and for storing the corresponding broadcast program schedule data if they are identical and a video recording controller for comparing the broadcast program schedule data stored in the controller with the broadcast program schedule data processed by the schedule data processor to thereby output a video recording control signal when it is determined that the corresponding broadcast program has been received.

Preferably, the schedule data processor includes a data separator 30 for separating the broadcast program schedule data from the broadcast signal received through the tuner 20, a data detector 40 for recognizing the broadcast program schedule data separated from the data separator 30 per reserved video recording information data and a latch unit 50 for temporarily storing the broadcast program schedule data in accordance with the information recognized by the data detector 40.

The controller can advantageously include a microcomputer 60 for encoding the program title input through the data input device 10 to thereby output the same, a comparator 70 for comparing the program title encoded at the microcomputer 60 with the title data of the program temporarily stored in the latch unit 50 of the schedule data processor and a reserved program memory 80 for providing the broadcast program schedule data of corresponding latch unit 50 through the microcomputer 60 to thereby store the same if the title data of the program are identical as a result of the comparison at the comparator 70.

The video recording controller preferably includes a comparator 90 for generating a video recording control signal used in starting the video recording after a comparison is made between the data in latch unit 50 of the schedule data processor and the broadcast program schedule data output from the microcomputer 60 of the controller if and when both data are identical. In an exemplary case, the broadcast program schedule data input through the latch unit 50 of the schedule data processor is decoded by a decoder 100 to thereby be output to the comparator 0.

It will be noted that the image signal received through the tuner 20 is output to a display via a display control unit 110. Additionally, the broadcast program schedule data output from the microcomputer 60 of the controller is input to the display control unit 110 in order to permit an on-Screen-Display (OSD) function.

The operational sequence for the apparatus constructed as described with respect to FIG. 1 will now be described.

The user first provides a program title via data input device 10. According to one aspect of the preferred embodiment of the present invention, the user can either input a whole program title or part of the title in order to initiate the reserved video recording. However, it will be appreciated that it will be easier and more convenient to input only part of the title. When only part of the title is to be input via device 10, it is necessary to indicate, e.g., in block letters, a unique word or character sequence which is needed to perform the reserved program input for the desired broadcast program. In an exemplary case, a data source, e.g., a newspaper, a magazine or the like, will include both the broadcast schedules and the character sequence.

Preferably, when the user inputs the program title, the OSD function provided by the television or the VCR itself can be utilized. While the OSD function is being performed, the vowels and consonants of the Korean Hangul alphabet or, in another exemplary case, the English alphabet are displayed in a predetermined order on the television screen through the display control unit 110 and are selected by a cursor. In other words, at least one of the basic characters is indicated on the screen, e.g., vowels and consonants of the Korean Hangul alphabet, so that the desired basic character component unit can be selected to thereby construct the character in a combinational style. As discussed in greater detail below with respect to FIG. 2C, the word shown is composed of five characters which are combined to form two syllables. Furthermore, the character input on the screen should indicate at least more than one perfect character or word, so that the desired character or word can be selected.

It should be noted that, when a separate character plate covering the basic character component unit is provided on the remote controller, the title can be input directly. In other words, when the character plate is proved and used on the remote controller, keys corresponding to vowels and consonants of Korean Hangul alphabet are allocated to the remote controller, so that the data can be input easily.

The title of the reserved program input through the data input device 10 advantageously is encoded through a predetermined transform processing routine implemented by microcomputer 60.

As an example of a method by which the input character data is encoded, the data can be encoded in a form illustrated in the table of FIG. 2A. It will be appreciated that other tables can be implemented without departing from the present invention. For example, the data can be displayed in a binary format instead of hexadecimal. In addition, the English alphabet can be substituted for the Hangul alphabet. By using the table of FIG. 2A, the Korean TV serial program having the title shown in FIG. 2B can be input to the circuitry shown in FIG. 1.

According to the present invention, television broadcast program listings appearing in newspapers or guide books will advantageously include two different letter styles in order to distinguish certain particular parts of the program title from the other ordinary parts of the program titles. In an exemplary case, part of the program title would be indicated by heavy block letters while the rest of the title would be shown in a contrasting letter style. In another exemplary case regarding English language titles, the particular parts necessary for program reservation are indicated in capital letters or in cursive to facilitate encoding as much as possible.

If the user inputs sequentially the data in the order shown in FIG. 2C, with the help of the OSD function and/or the remote controller, the microcomputer 60 transforms, e.g., encodes, the entered data to data having the form 'OA 16 19 08 18' based on information presented in FIG. 2A. It will be appreciated that the whole title advantageously can be encoded as 'OA 16 19 08 18 07 10 OA 10 02 IC 04 19'. The code thus transformed is stored temporarily in a memory unit of the microcomputer 60.

Meanwhile, the broadcast signals received through tuner 20 are input to data separator 30 and the display control unit 110 separates only the broadcast program schedule data input during the vertical retrace line blanking interval from the broadcast signals to thereafter output the same.

The broadcast program schedule data, as illustrated in FIG. 3, comprises a character header and broadcast schedule data. The data for this kind of reserved program is transmitted from the broadcast station during a vertical retrace line blanking interval, i.e., the vertical blanking interval, where there is no image signal.

Figure 4:
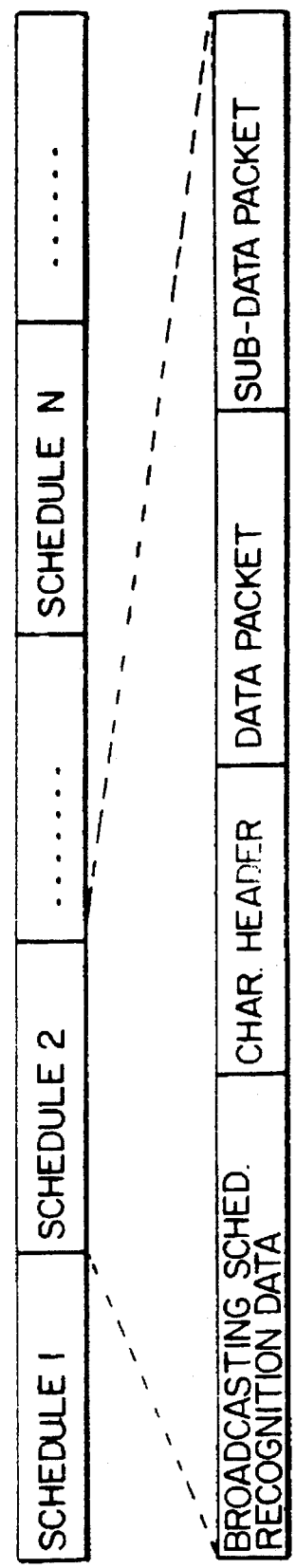
FIG. 4 is a more detailed illustration of the format of broadcast schedule data shown in FIG. 3.

The broadcast schedule data, as illustrated in FIG. 4, comprises broadcast schedule recognition data, character header, data packet and a subdata packet of update-purpose program data.

The data packet, as illustrated in FIG. 5A, is composed of a data packet recognition data, a whole title data of the broadcast program and a reserved program data comprising a reserved program recognition data, starting time data, finishing time data, channel data wherefrom the program is broadcast and broadcast date data. The subdata packet is a data necessary for a serial video recording, and as illustrated in FIG. 5B, comprises a subdata packet recognition data, starting time data of the next broadcast necessary for updating the reserved program, finishing time data and broadcast date data.

These kinds of broadcast program schedule data are the information predesignated between the broadcast station and the receiver, and are continuously transmitted from the station.

It will be appreciated that one screen has 60 vertical retrace line blanking intervals. Out of these 60 intervals, a number of predetermined intervals (3 intervals for the present invention) transmit a broadcast program schedule data against an on-the-air program. Thus, the whole broadcast program schedule data are transmitted during the balance of the intervals (60−3= 57 vertical retrace line blanking intervals for the present invention).

It should be noted that the broadcast schedule recognition data is a recognition code for identifying respective schedules. Preferably, the character header which is a program title used during input of the reserved program is a code composed of unique characters to distinguish the desired program title from the other program titles. The code can advantageously be a code corresponding to the characters indicated in block letters in program guiding columns of the newspaper, guide book or the like, which code is supplied by the broadcast stations and which code doesn't overlap other program titles.

If these data are respectively separated by the data separator 30, so that the data detector 40 can detect the broadcast schedule recognition data, title recognition data, reserved program recognition data and subpacket recognition data, the detector 40 transmits a control signal to latch unit 50 to indicate the presence or absence of the enumerated recognition data. The latch unit 50 latches the data separated from the data separator 30 to respective latches within the latch unit 50.

Figure 9:
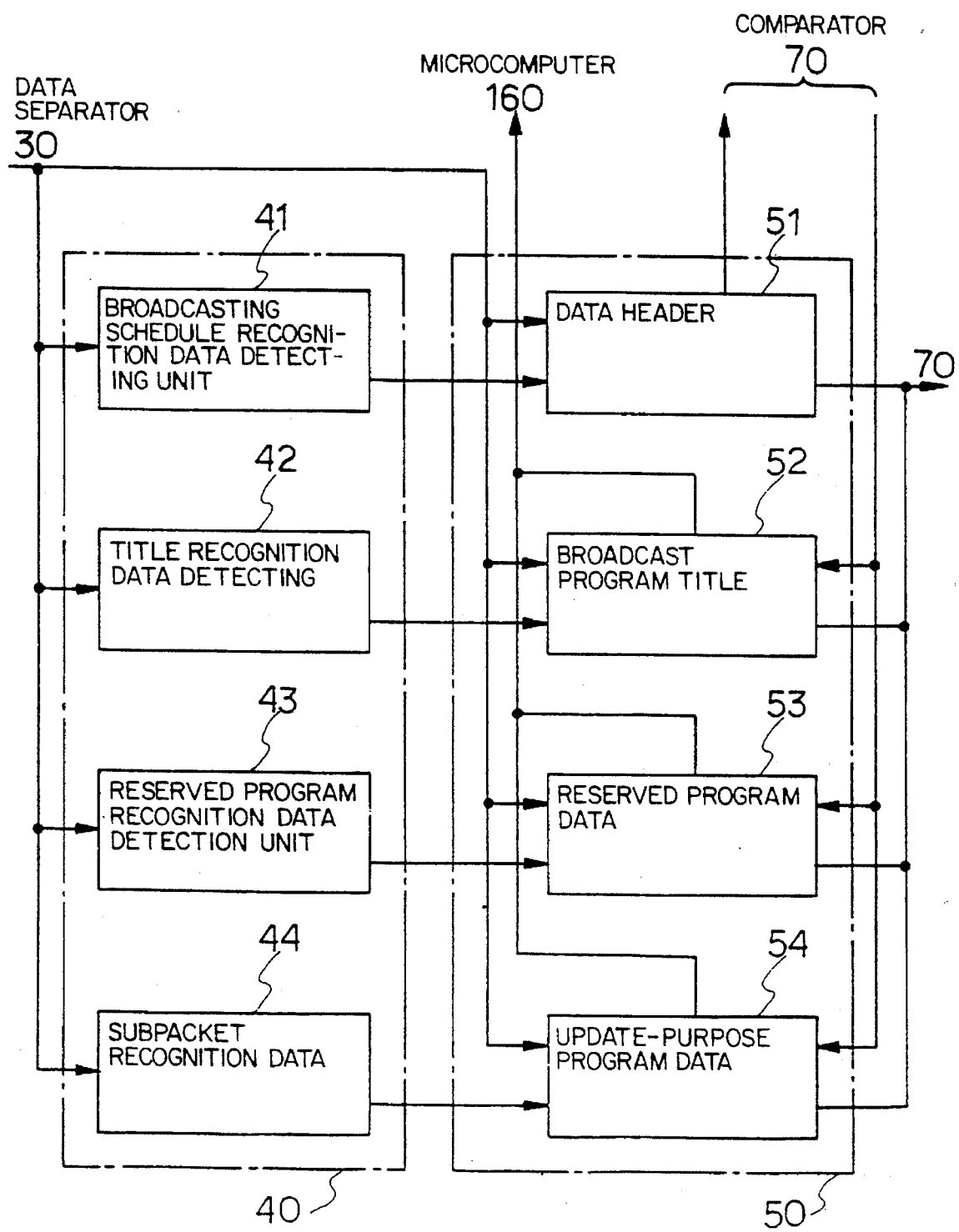
FIG. 9 is a detailed block diagram of a data detector and a latch circuit illustrated in FIG. 1.

Though FIG. 1 is constructed and consequently explains the data separator 30 and the data detector 40 as separate circuits, it is also possible to process the data using a single circuit where the data separator 30 and data detector 40 are combined in one unit for determining whether the input data has been separated and the corresponding data has been input or not. In other words, the construction of the data detector and the latch unit used for the present invention can be made as illustrated in FIG. 9, wherein the data separated from the data separator 30 are sequentially input into respective detectors (41 to 44) within the data detector 40, and in accordance with an existence and/or non-existence of detected data, outputs from the data separator 30 are latched to respective latches (51 to 54) within the latch unit 50.

Character data, which corresponds to the character header found in the latched data, is input via the data input device 10, so that the input character data advantageously can be compared by the comparator 70 with the encoded data generated by microcomputer 60. Here, the data from the controller of the microcomputer 60 is the data about the broadcast program the user intends to record. As a result of the comparison, if both the encoded and the latched data are coincident, the data latched by latch unit 50 in accordance with the output of the comparator 70 are sequentially transmitted to reserved program memory 80. Preferably, the data transmitted to reserved program memory 80 from latch unit 50 transmits more than the just character header.

The microcomputer 60 outputs to another comparator 90 the reserved video recorded data stored in the reserved program memory 80 when it is determined that the broadcast starting time stored in the reserved program memory is nearing the current time. The aforesaid data is compared with the data decoded at a decoder 100 at the comparator 90. When both data are coincident, the comparator 90 outputs the video recording control signal to thereby start the video recording.

Advantageously, when the character header detected from a broadcast signal source disagrees, or meets a data regarding a video recording finish, the video recording operation is stopped. However, if the data is not detected due to a bad broadcast receiving state, a recording time is calculated and the video recording is performed according to the calculated time. In other words, the video recording is performed by subtracting the starting time from the finishing time.

When the video recording is finished, the microcomputer 60 separates respective data from the subdata packet which provides updated program data to thereby update the starting time, finishing time and broadcast date to a starting time, finishing time and broadcast date for the reserved program which has just completed being recorded.

After the video recording finished reserved program data has been updated, a character header value of video recording finished reserved program and the character header included in the broadcast signal source are compared. When the character headers correspond, the data of the subdata packet is up-dated to a position where the data of subdata packet for the video recording finished reserved program used to be. Accordingly, even when recording the same program over a number of days, the reserved data is automatically updated.

It will be noted that, while the present invention preferably includes comparators 70 and 90 as separate elements, the dual comparators advantageously can be implemented in software performed by microcomputer 60 and, thus, one comparator is sufficient to perform both comparison functions.

Figure 7:
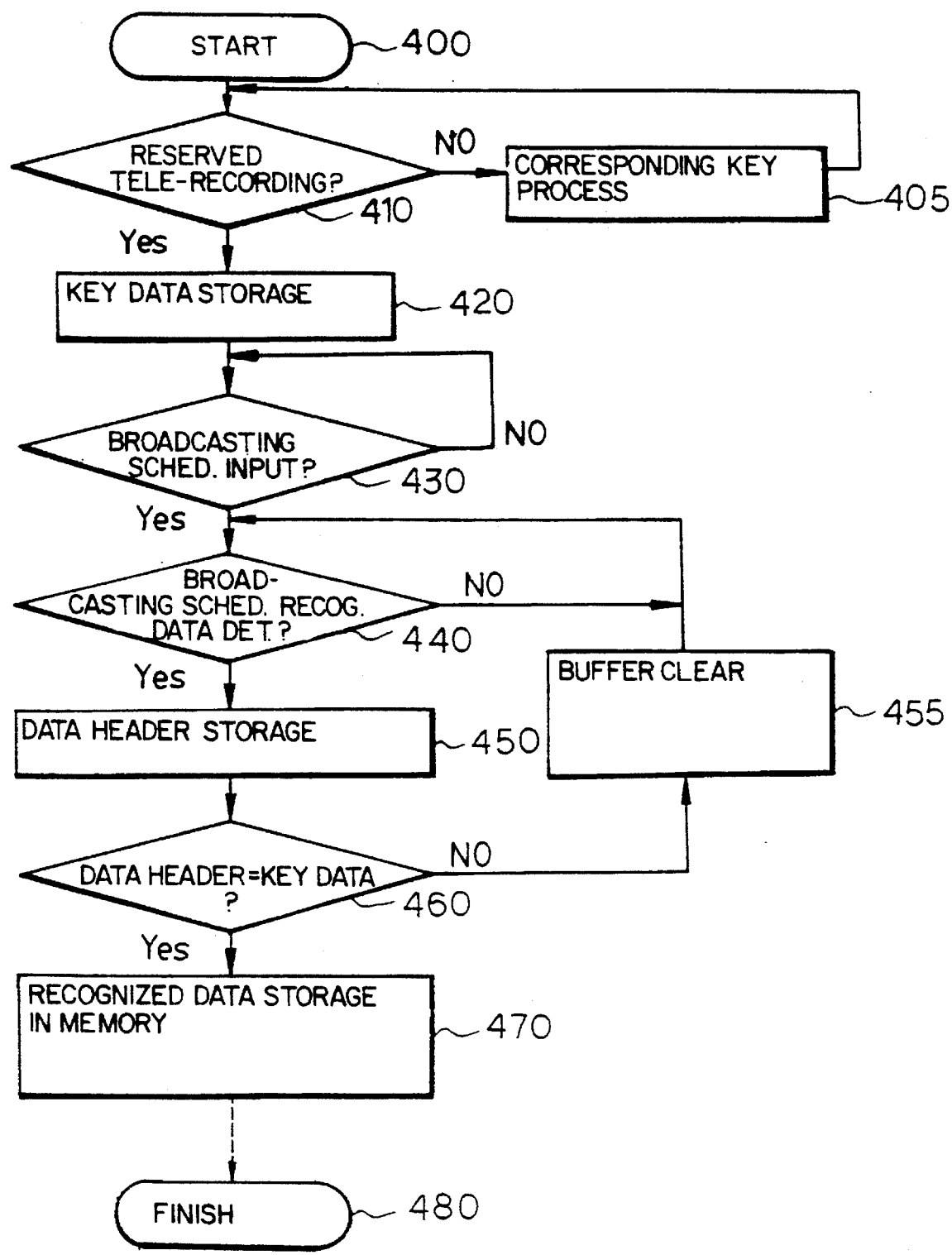
Figure 8:
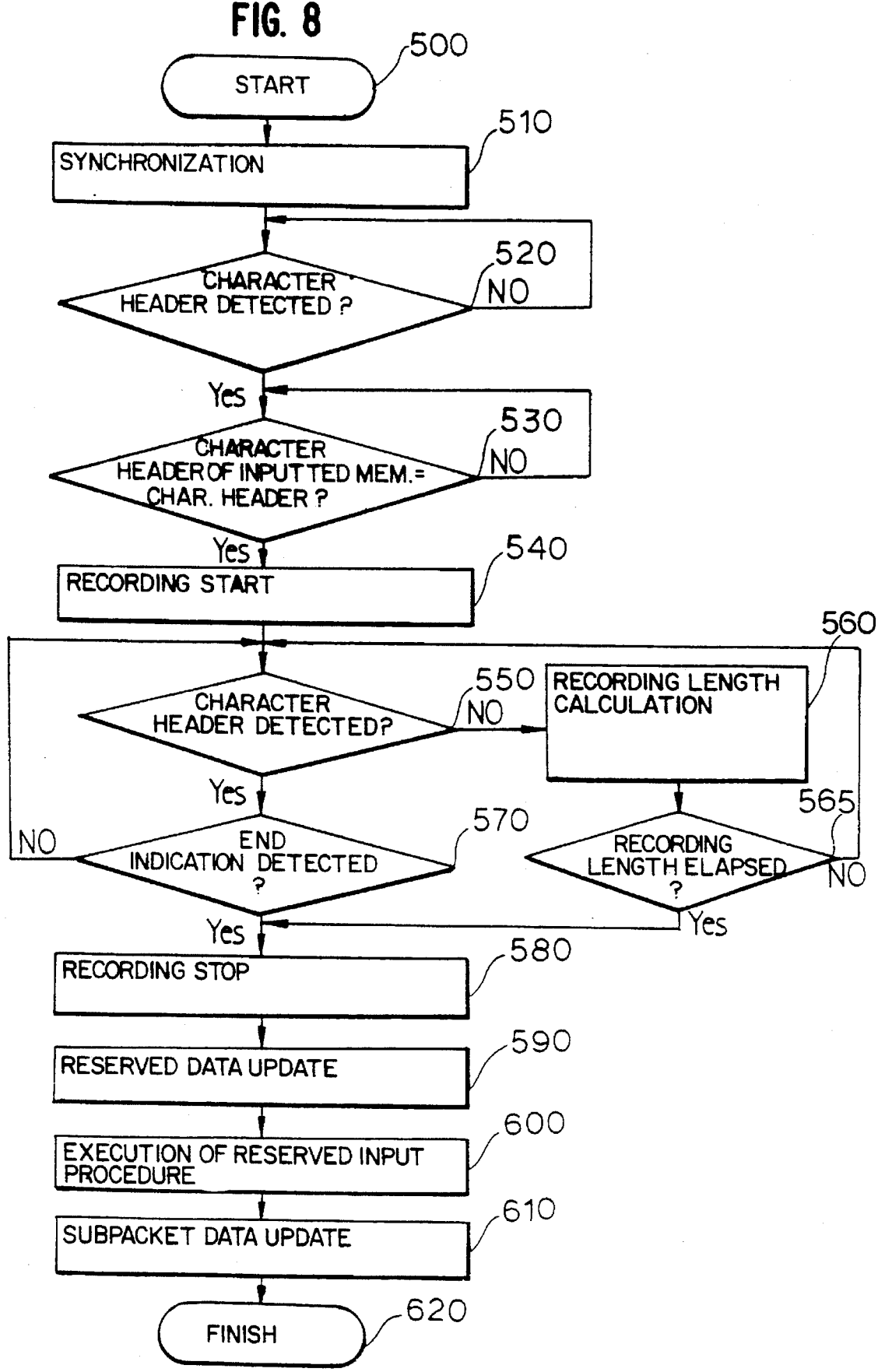
FIG. 8 is a flow chart for illustrating a process wherein a reserved video recording data is performed in accordance with the present invention.

The reserved video recording method using character input in accordance with the present invention will now be described in detail while referring to FIGS. 6 through 8.

As illustrated in FIG. 6, after initialization is preformed at step 100 the user starts key input of character data using a remote controller or a key attached to body during step 110. Preferably, the data input to microcomputer 60 via data input device 10 is distinguished from data for providing conventional functions by determining whether or not a reserved mode of operation is set during step 120. If the input data is the data for performing the conventional functions, e.g., reproduction of the video recorded information and video recording of the program and the like, a display control unit 110 or a servo control unit (not shown) is driven to thereby drive a monitor or a deck unit, so that a function corresponding to the input data can be performed during step 130.

If the input data is the data for establishing the reserved video recording mode, the display control unit 110 having the OSD function is driven to make the reserved process easier to implement by utilizing the OSD function so that necessary information advantageously can be displayed on the screen as it is input during step 140. The user waits until there is an indication on the screen that information about the reserved video recording should be input and until there is a key input for a predetermined period of time during step 150.

If there is a key input, control is passed to step 170 whereby the data input at the step 150 can be displayed on the screen and the user can verify the input characters.

When a preset screen hold time, e.g., a predetermined time after the reserved mode is entered during step 120 and an indication is displayed on the screen during step 140, elapses without further key input, it is decided that there will be no more data input during step 160, and the OSD screen is eliminated to thereafter return to the original state during steps 190 and 200.

If there is a data input within the screen hold time, as determined during step 150, control passes to step 170, wherein the data input during step 150 is displayed. Afterwards, it is questioned whether or not the indicated reserved video recording data should be stored during step 180.

Of course, in the present invention, the data input by the user and the data transmitted from the broadcast signal source are compared, and if both data are coincident, the reserved video recording data can be stored right away without questioning. When the input data is to be stored, the data can be stored in a memory within the microcomputer 60, or the reserved data can be stored in a separate memory during step 220. After storage has been completed, the program returns to the original state. However, when the input data indicates that the reserved mode is to be cancelled, cancellation of reserved mode is accomplished by data input and the corresponding data is displayed on the screen during step 190. After an elapse of predetermined period of time, the OSD information displayed on the screen is erased off during step 200 and the system is returned to the original state.

Now, steps 210 and 220 regarding the reserved establishment processes thus described will be explained in greater detail with reference to FIG. 7.

When the user operates a key, the microcomputer 60 determines whether or not the key operation is related to the reserved video recording during step 410. If the key input has nothing to do with reserved video recording, the function associated with the key is performed during step 405. When the input key is related to reserved video recording, flow returns to the reserved mode of operation and the input key is displayed on the screen, as a character of the program title to be reservedly video recorded, by means of the OSD function during step 410. The corresponding data is thereafter stored during step 420.

After the key data has been stored, a test is performed to determine whether the broadcast schedule has been input during step 430. If the broadcast schedule has not been input, the test is repeated to check the input. However, if the broadcast schedule has been input during step 430, the control program advances to step 440, wherein a check is performed as to whether the key data the user has input and the broadcast schedule recognition data to be compared are detected. If the broadcast schedule recognition data is detected, the recognition data is stored with the character header in order to compare the data header with the key data the user input during step 450. The data stored in the character header is compared with the key data the user has input during step 460. As a result of comparison at step 460, if the data are different, the corresponding buffer is erased off during step 455, and the program returns to step 440 to redetect the broadcast schedule data, thus repeating steps 440 to 460.

During the comparison, when the data are identical, each recognized data, i.e., the whole program title shown in FIG. 2B, starting and finishing time of the program, channel, date, character header code, update-purpose starting time, finishing time, date, update-purpose character header code and the like, is stored in the memory during step 470 to thereby finish the reserved video recording establishment process during step 480.

An execution process of the reserved video recording data thus stored in the memory will now be described while referring to FIG. 8.

When the broadcast starting time nears the present time, the tuner 20 is synchronized with a signal transmitted from the broadcast signal source during step 510 to thereby determine whether the character header is detected by the detector during step 520. When the character header is not detected, the program repeats the detecting step 520 until the character header is detected before advancing to the next step.

When the character header has been detected during step 520, a comparison is made during step 530 between the character header stored in the memory and the detected character header. When the header data does not agree, the program returns to step 530 to thereby repeat the aforesaid processes. When the data does correspond, video recording is started during step 540.

A continuous check is made during the video recording to determine whether the character header has been detected during step 550. When the character header is detected, the program then checks for the presence of a label corresponding to an end indication during step 570.

If the character header is the end indication, the recording is stopped during step 580. When the character header is not the end indication, the program returns back to the start of step 550 to thereby continue recording while determining whether the character header has been detected. If the character header has not been detected at the character header detection step 550, e.g., received state of the broadcast signal is of poor quality, the recording length is calculated using starting time and finishing time of the reserved video recording data already stored in the memory during step 560 and the recording length is compared during step 565 with the actual recording length. When the actual video recording length is shorter than the calculated recording length, video recording is continued. The program returns to step 550 for determining the existence and/or non-existence of the character header during step 550. If the video recording length is longer than the recording length, the recording is stopped during step 580.

When the recording is stopped, if data exists in the subdata packet of the data stored in the memory, which implies that there exists further installments of the video recorded program, the reserved data is updated during steps 590 and 600. In other words, the microcomputer 60 updates the reserved data to the starting time, finishing time and character header code included in the subdata packet. It will be appreciated that this permits the video recording finished reserved program to be updated so that further comparisons of the character header value for the video recording finished reserved program with the character header carried on the broadcast signal source. Thus, when both character headers are coincident, the data of subdata packet is updated to a position where the data of subdata packet for the video recording finished reserved program used to be during step 610. Then, the reserved video recording execution process is finished during step 620.

As mentioned in the aforesaid technique, the present invention provides an effective apparatus for performing a reserved program by an input of part of the title instead of the whole program title, and because the present invention has available data for indicating the title of the broadcast program from the data stored in the reserved program memory 80, it is easy to confirm the reserved video recording data on the screen by utilizing the OSD function.

Furthermore, regardless of changes of the broadcast plan, the present invention provides an effective apparatus of performing a reserved video recording of the program.

Although the invention has been described in detail with reference to its presently preferred embodiment, it will be understood by one of ordinary skill in the art that various modifications can be made without departing from the spirit and the scope of the invention. For example, the order of the broadcast program schedule data can be changed without departing from the spirit and scope of the present invention. It will be appreciated that one of the ordinary skill in the art can change the data order and still achieve the objects of the present invention.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A character input reserved video recording method, said method comprising the steps of:

(a) providing a title of a program to be recorded during a reserved video recording mode of operation;

(b) encoding the title of the program to be recorded input during step (a) to produce title data, detecting data corresponding to the title data out of received broadcast program schedule data, and comparing said title data with said schedule data;

(c) when said title data and said schedule data are identical as determined in said step (b), detecting and storing said broadcast program schedule data; and (d) video recording the corresponding broadcast program in accordance with the broadcast program schedule data detected and stored during said step (c).

2. The character input reserved video recording method as defined in claim 1, wherein said step (a) step further comprises providing a whole title of the program to be recorded.

3. The character input reserved video recording method as defined in claim 1, wherein said step (a) further comprises providing at least a partial title of the program to be recorded and wherein said broadcast program schedule data comprises character header data, whole title data of the broadcast program, reserved program data, and an update program data.

4. The character input reserved video recording method as defined in claim 1, said method further comprising the step (e) of transmitting said broadcast program schedule data from a broadcast station.

5. The character input reserved video recording method as defined in claim 4, wherein said step (e) further comprises transmitting during a vertical retrace line blanking interval said broadcast program schedule data from said broadcast station.

6. The character input reserved video recording method as defined in claim 5, wherein said step (e) comprises transmitting said broadcast program schedule data against the presently on-the-air program, wherein said schedule data is transmitted during a predetermined vertical retrace line blanking interval while the whole broadcast program schedule data is transmitted outside of said predetermined vertical retrace line blanking interval.

7. The character input reserved video recording method as defined in claim 6, wherein said transmitting step (e) includes transmitting said broadcast program schedule data by periodically repeating an interval where one screen is transmitted.

8. The character input reserved video recording method as defined in claim 5, wherein said transmitting step (e) further comprises transmitting said broadcast program schedule data by periodically repeating an interval where one screen is transmitted.

9. A character input reserved video recording apparatus, comprising:

a data input device for providing a title of a program to be recorded during establishment of the reserved video recording;

a schedule data processor for separating broadcast program schedule data from a broadcast signal received through a tuner and for storing said schedule data temporarily;

a controller for encoding the title of the program to be recorded input through the data input device to produce encoded data, for comparing the encoded data with said schedule data stored in the schedule data processor and for storing broadcast program schedule data if said encoded data and said schedule data are identical to produce stored data; and video recording controller for comparing said stored data with said broadcast program schedule data received by said schedule data processor and for producing a video recording control signal when the broadcast program corresponding to said stored data is received.

10. The character input reserved video recording apparatus as defined in claim 9, wherein the title of the program to be recorded input through the data input device is a whole title of the program to be recorded.

11. The character input reserved video recording apparatus as defined in claim 9, wherein the title of the program to be recorded input through the data input device is a partial title of the program to be recorded.

12. The character input reserved video recording apparatus as defined in claim 9, wherein the broadcast program schedule data comprises:

a character header data;

a whole title data of the broadcast program;

a reserved program data; and an update-purpose program data.

13. The character input reserved video recording apparatus as defined in claim 9, wherein the broadcast program schedule data is transmitted from a broadcast station.

14. A character input reserved video recording apparatus as defined in claim 13, wherein the broadcast program schedule data is transmitted during vertical retrace line blanking interval.

15. The character input reserved video recording apparatus as defined in claim 14, wherein the broadcast program schedule data for the presently on-the-air program is transmitted during a predetermined vertical retrace line blanking interval while the whole broadcast program schedule data is transmitted outside the predetermined vertical retrace line blanking interval.

16. The character input reserved video recording apparatus as defined in claim 15, wherein the broadcast program schedule data is transmitted by periodically repeating an interval where one screen is transmitted.

17. The character input reserved video recording apparatus as defined in claim 14, wherein the broadcast program schedule data is transmitted by periodically repeating an interval where one screen is transmitted.

18. The character input reserved video recording apparatus as defined in claim 9, wherein the schedule data processor comprises:

a data separator for separating the broadcast program schedule data from the broadcast signal received from a tuner;

a data detector for recognizing the broadcast program schedule data separated from the data separator using reserved video recording information data; and a latch unit for temporarily storing the broadcast program schedule data in accordance with the information recognized by the data detector.

19. The character input reserved video recording apparatus as defined in claim 9, wherein said controller comprises:

a microcomputer for encoding the title of the program to be recorded input through the data input device to thereby output encoded data;

a comparator for comparing the encoded data with a selected portion of said schedule data temporarily stored in the latch unit of the schedule data processor; and a reserved program memory receiving said schedule data from the latch unit through the microcomputer for storing the said schedule data when the encoded data and said schedule data are identical.

20. The character input reserved video recording apparatus as defined in claim 9, wherein the video recording controller includes a comparator for generating a video recording control signal for starting video recording when comparison said schedule data and said stored data are identical.

21. The character input reserved video recording apparatus as defined in claim 20, further including a decoder receiving said schedule data from a latch unit and for providing decoded schedule data to said comparator.

22. The character input reserved video recording apparatus as defined in claim 9, further including a display control unit for controlling the image signal received through the tuner and said schedule data output by said controller to simultaneously display said image signal and said schedule data.

23. The character input reserved video recording apparatus as defined in claim 22, wherein said schedule data output from said controller is respective data about a broadcast program a user wants to reservedly video record.

* * * * *